Nov. 17, 1931.  F. A. WRIGHT  1,832,801
SECTIONAL KNOCKDOWN HOLDER
Filed Dec. 5, 1930   3 Sheets-Sheet 2
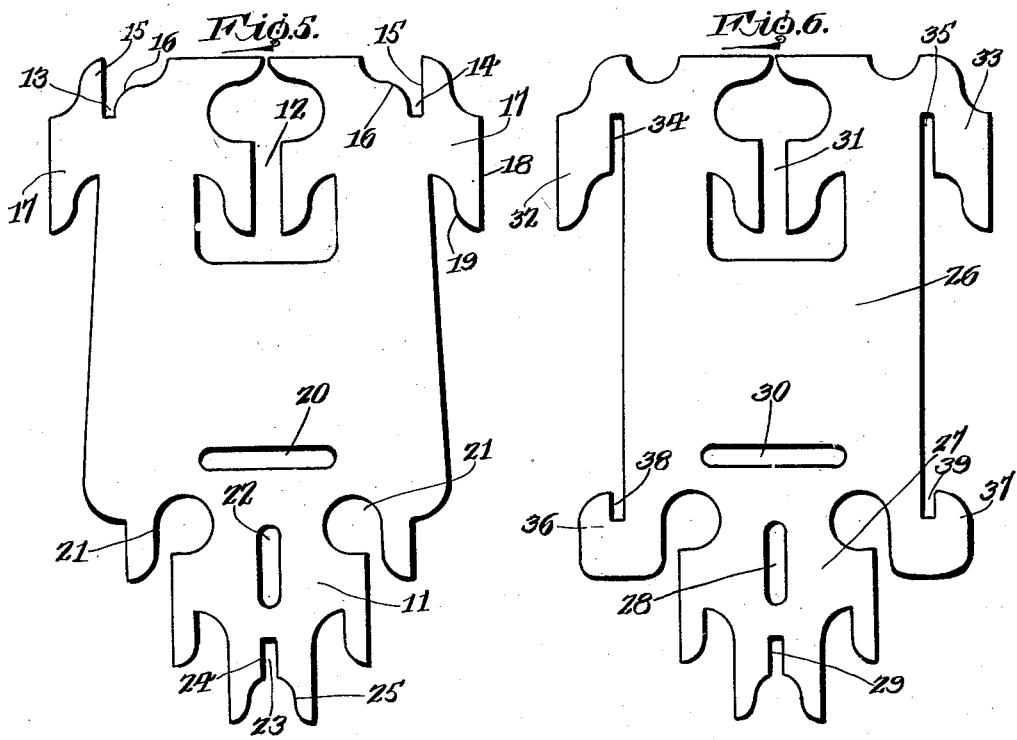
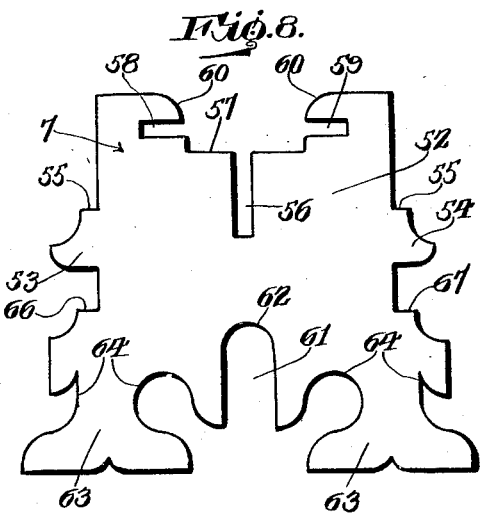
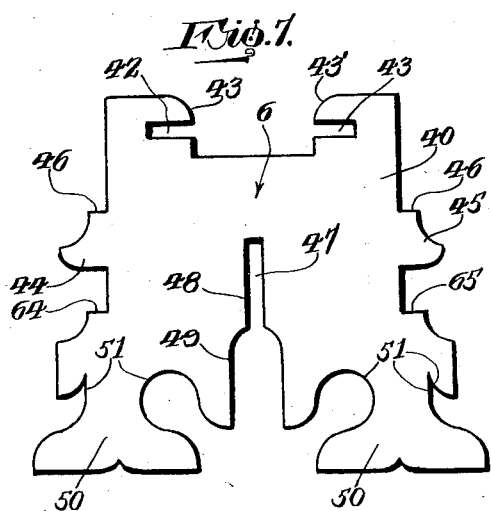
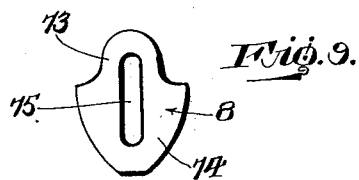
INVENTOR.
Fred A. Wright
BY
Geo. P. Kimmel
ATTORNEY.

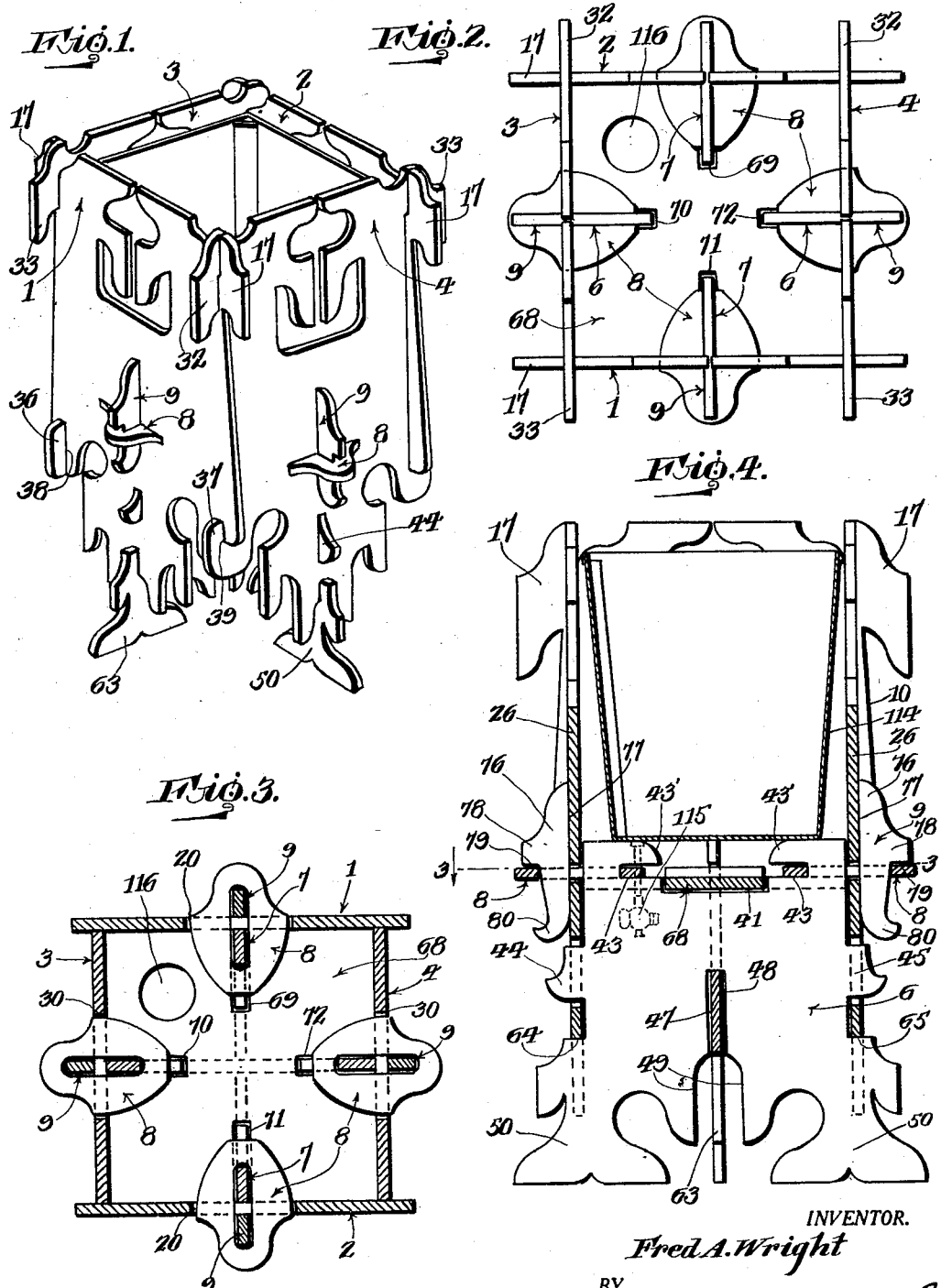

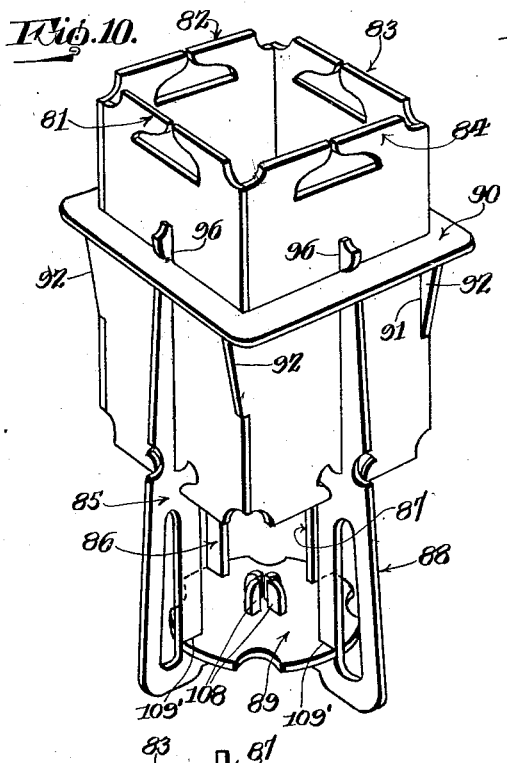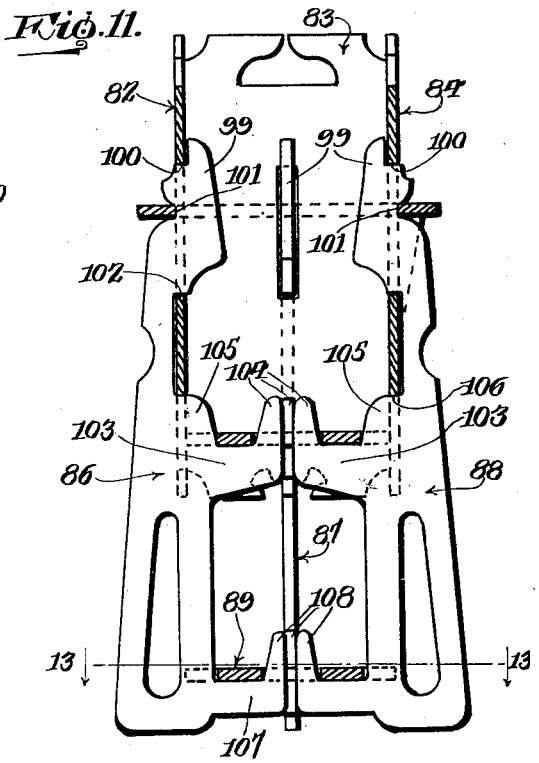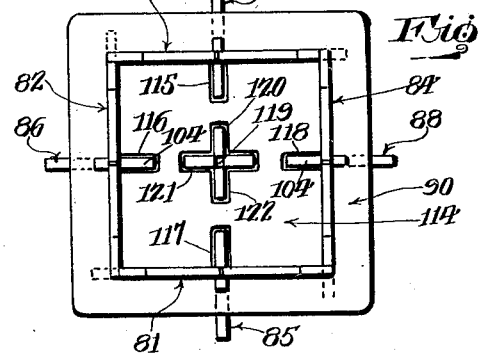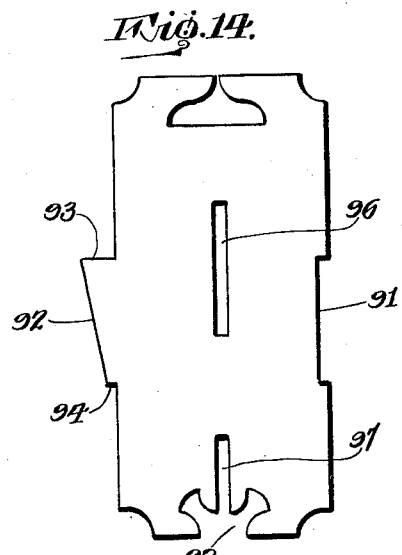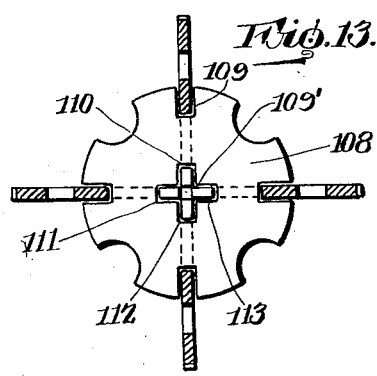

Patented Nov. 17, 1931

1,832,801

UNITED STATES PATENT OFFICE

FRED A. WRIGHT, OF CARSON CITY, MICHIGAN, ASSIGNOR TO THE WRIGHT MANUFACTURING COMPANY, A CORPORATION OF MICHIGAN

SECTIONAL KNOCKDOWN HOLDER

Application filed December 5, 1930. Serial No. 500,238.

This invention relates to a sectional knockdown holder designed primarily for supporting flower receptacles or pots, but it is to be understood that a holder in accordance with this invention may be employed in any connection for which it may be found applicable, and the invention has for its object to provide, in a manner as hereinafter set forth, a holder for the purpose referred to formed of a series of interengaging sections capable of being readily assembled and disassembled and to provide respectively for the expeditious setting up and knocking down of the holder when occasion requires.

A further object of the invention is to provide, in a manner as hereinafter set forth, a sectional holder for the purpose referred to including new, novel and thoroughly efficient locking means for the sections of the holder to securely couple such sections together for the purpose of maintaining the holder in set up position when supporting a flower receptacle, flower pot or other objects.

Further objects of the invention are to provide, in a manner as hereinafter set forth, a sectional knockdown holder for the purpose referred to which is simple in its construction and arrangement, strong, durable, thoroughly efficient in its use, readily assembled and disassembled when occasion requires, having the elements thereof capable of being piled in a compact manner when the holder is knocked down, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a perspective view of a holder in accordance with this invention when set up.

Figure 2 is a top plan view of the holder when set up.

Figure 3 is a sectional plan of the holder when set up.

Figure 4 is a vertical sectional view of the holder when set up and further illustrating a flower receptacle or pot supported thereby.

Figure 5 is an elevation of one of the body sections of the holder.

Figure 6 is an elevation of another body section of the holder.

Figure 7 is an elevation of one of the base sections of the holder.

Figure 8 is an elevation of another of the base sections of the holder.

Figure 9 is an elevation of the form of locking member employed.

Figure 10 is a perspective view of a modified form of the holder when set up.

Figure 11 is a vertical sectional view of the modified form of the holder when set up.

Figure 12 is a top plan view of the modified form of the holder when set up.

Figure 13 is a sectional plan of the modified form of the holder when set up.

Figure 14 is an elevation of the form of body section employed in the modified form of holder.

Referring to Figures 1 to 9 of the drawings, the holder includes two pairs of body sections, a pair of base sections, a bottom section, four locking members and four retaining members. The sections of one pair of body members are indicated generally at 1, 2 and are of like construction, the sections of the other pair of body sections are indicated generally at 3, 4 and are of like construction, the pair of base sections are indicated generally at 6, 7, the locking members are indicated generally at 8 and the retaining members are indicated generally at 9.

The sections 1, 2 include a body part 10 formed at its lower end with a depending extension 11. The upper portion of the body part 10 is cut out, as at 12 for the purpose of ornamentation. The body part 10 at its upper end is formed with a pair of grooves 13, 14 each having its outer wall 15 straight and its inner wall 16 of ogee curvature. The body part 10 at each side of its upper portion is formed with a lateral extension 17 having its outer side edge 18 straight and its bottom edge 19 of compound curvature. The body part 10 in proximity to the extension 11 is formed with a transverse slot 20. The slot 20 is disposed centrally with respect to body part 10. The bottom of body part 10 and the upper part of extension 11 is cut away in a scroll like manner for ornamentation as at 21. The extension 20 at its vertical median is formed with a transverse slot 22 and below the slot 22 the extension 11 is formed with a groove 23 opening at the bottom of extension 11 and having the upper portion of each side wall straight as at 24 and the lower portion of each side wall of compound curvature as indicated at 25.

The sections 3 and 4 include a body part 26 which is of less width than the body part of either sections 1 or 2. The bottom of body part 26 is formed with an extension 27 provided at its vertical median with a slot 28 and below the slot 28 with a groove 29 having the side walls thereof set up in the same manner as the side walls of the groove 23. The body part 26 in proximity to the extension 27 is formed with a transverse slot 30 centrally thereof. The upper portion of body part 26 is cut away in a scroll like manner as at 31 for ornamenting purposes. The upper portion of body part 26 is formed at its sides with lateral extensions 32, 33 providing in connection with the side edges of body part 26, grooves 34, 35 respectively open at their lower ends. The body part 26 at its lower end is formed with a pair of lateral extensions 36, 37 which provide in connection with the side edges of the body part 26 a pair of grooves 38, 39 respectively which are oppositely disposed with respect to the grooves 34, 35.

The base section 6 includes a body part 40 having its top formed centrally with a wide groove 41 and a pair of oppositely disposed grooves 42, 43 which open into the groove 41 below the top edge of body part 40. The walls of the groove 41 at the upper portions thereof are oppositely curved as at 43. Projecting from the side edges of the body part 40 are oppositely disposed tongues 44, 45 having flat top edges 46. The body part 40 at its vertical median is formed with a groove 47 which opens at the bottom edge of body part 40. Each side wall of the groove 47 has a straight upper part 48 and an offset outer part 49. Extending from the body part 40 is a pair of spaced supporting legs 50. The base section 6 is cut away in a scroll like manner as at 51 for ornamenting purposes.

The base section 7 comprises a body part 52 provided at its side edges with oppositely disposed tongues 53, 54 having flat top edges 55.

The upper portion of body part 52 at its vertical median is formed with a lengthwise disposed groove 56 which opens into a wide groove 57. The body part 52 is formed with a pair of oppositely extending grooves 58, 59 which open into the groove 57 at the sides thereof. The outer part of the side walls of the groove 57 are oppositely curved as at 60. The grooves 58, 59 are disposed at right angles to the groove 56 and are of less length than the groove 56. The body part 52 at the lower portion thereof and at its vertical median is formed with a wide groove 61 which opens at the bottom edge of body part 52 and has its inner wall rounded as at 62. Depending from the body part 52 is a pair of spaced supporting legs 63 and said body part 52 is cut away in a scroll like manner as at 64 for ornamenting purposes.

The body part 40 below the tongues 44, 45 is shouldered at its sides, as at 64, 65. The body part 52 below the tongues 53, 54 has its sides shouldered as at 66, 67 respectively.

The bottom member or section as referred to generally at 68 is of square contour and is formed with four grooves 69, 70, 71 and 72, which are disposed at right angles to each other and open at the edges of the bottom section 68. Each groove extends from a point removed from the center of bottom section 68 to an edge of such section. The grooves 69, 71 are arranged in alignment but are oppositely disposed. The grooves 70, 72 are arranged in alignment but are oppositely disposed.

Each locking member 8 comprises a body portion formed of a semi-oval part 73 and a semi-elliptical part 74. The part 73 is of less width than the part 74 and is inset with respect to the latter. Each locking member is formed with a lengthwise disposed slot 75.

Each retaining member comprises a body part 76 having a straight inner edge 77. The outer side of the body part 76 is formed with a laterally extending lug 78 having a flat lower edge 79. The lower end of body part 76 is in the form of a hook as indicated at 80. The body part 76 from the edge 79 to the lug 78 gradually decreases in width to the lower end of said body part 76.

When the holder is set up the body sections 3, 4 are arranged between the body sections 1, 2 and said body sections 1, 2 project laterally from the body sections 3, 4.

When the holder is set up the base member 6 is disposed at right angles to the base member 7. The base member 6 extends into the groove 56 of base member 7 and the latter extends into the groove 47 of base member 6. Under such conditions the base sections 6 and 7 interengage with each other. When the base members 6 and 7 are interengaged with each other they are adapted to support the bottom section 68 and the latter seats upon the bottom wall of the grooves 41, 57 and the base sections 6, 7 extend up through the slots 69, 70, 71 and 72. The base section 7 extends up through the slots 70, 72 and the base section 6 extends up through the slots 69, 71.

When the holder is set up the tongues 44, 45 extend through the openings 28 of the body sections 3, 4 and the tongues 53, 54 extend through the openings 22 of the body sections 1, 2. When the holder is set up the inner wall of the grooves 29 of the sections 3, 4 seat on the shoulders 66, 67 of base section 7 and the inner walls of the grooves 24, 29 of the body sections 1, 2 seat upon the shoulders 64, 65 of the base section 6.

When the sections of the holder are in the positions heretofore referred to, the base section 6 extends up through the slot 75 of the pair of oppositely disposed locking members 8 and the base section 7 extends up through the other pair of locking members 8. The locking members being positioned upon the bottom section 68.

The retaining members 9 are extended through the slots 75 of the locking members and which will pull the locking members outwardly and said locking members will extend into the grooves 42, 43, 58 and 59 of the base sections whereby the hoder will be locked in set up position.

When the body sections 1, 2 are positioned relatively to the body sections 3, 4, the body sections 1, 2 are positioned in the grooves 34, 35, 38 and 39 of the body sections 3, 4 and the body sections 3, 4 are positioned in the grooves 13, 14 of the body sections 1, 2 whereby the body sections 3, 4 will overlap the body sections 1, 2 and the body sections will be detachably connected together. When the body sections are disconnected from each other the lower portions of the body sections 3, 4 are swung outwardly with respect to the lower portions of the body sections 1, 2. The body sections are not detachably connected together until after the bottom section and base sections are detachably connected together. After the body sections have been detachably connected together they are supported upon the locking members 8 and after the body sections are arranged to be supported by the locking members 8 the retaining members 9 are extended through the locking members and the several sections of the holder are fixedly secured in position and the means for securing the same in position is such that it can be readily detached to permit of the dismantling of the holder when desired.

Referring to Figures 10 to 14 of the drawings, they illustrate the modified form of holder, the latter including four body sections 81, 82, 83 and 84, four base sections 85, 86, 87 and 88, a locking member 89 and a retaining member 90. The body sections are of like construction. The base sections are of like construction.

With reference to Figure 14, each body section is of substantially rectangular contour of the desired thickness. One side edge of the body section is formed with a groove 91 of the desired width and its other side edge is provided with a laterally disposed triangular extension 92 of a length corresponding to the width of the groove 91 and is arranged in alignment with the latter. The extension 92 provides shoulders 93, 94, the former being of greater length than the latter. The body section also includes at its vertical median an elongated slot 96 and in alignment with the slot 96 a groove 97 which opens into a cutout 98 provided at the lower end of the section.

Each base section is formed with an inwardly extending tongue 99 at its upper end and which projects upwardly from the top edge 100 of the base section. Such top edge 100 provides a shoulder. The base section in proximity to its upper end is incut to provide a V-shaped groove 101. A part of the bottom edge of the extension 99 is squared as at 102 and which provides a shoulder. The base section intermediate its ends is formed with an inwardly extending U-shaped extension 103 having the arms thereof indicated at 104 and 105. That portion of the arm 105 indicated at 106 provides a shoulder and opposes the shoulder 102. Each base member in proximity to its lower end is formed with an inwardly extending angle shaped arm consisting of a horizontal leg 107 and a vertical leg 108. The latter extends upwardly from the inner end of the leg 107.

The locking member 89 is in the form of a disk 108 formed with radially disposed notches 109 which open at the outer edge of such disk. The disk 108 at the axis thereof is provided with an opening 109' of cruciform contour with the legs thereof indicated at 110, 111, 112 and 113. The legs 111 and 113 align and are also disposed in alignment with the pair of notches 109. The legs 110 and 112 are arranged in alignment and are also disposed in alignment with respect to the other pair of notches 109. The notches 109 are disposed at right angles to each other.

The modified form shown in Figures 10 to 14 also includes a bottom member 114 which is of square contour and formed with spaced notches 115, 116, 117 and 118 disposed at right angles with respect to each other and opening at the edge of the bottom member. Formed centrally of the bottom member 114 is an opening 119 of cruciform contour and which has its legs indicated at 120, 121, 122 and 123. The openings 120, 122 are arranged in alignment and also in alignment with the notches 115, 117. The openings 121, 122 are arranged in alignment and also in alignment with the notches 116, 118.

When setting up the holder, the body sections 81, 82, 83 and 84 are assembled in a manner whereby one side edge of the section 81 abuts the inner face of the section 82, one side edge of section 82 abuts the inner face of section 83, one side edge of section 83 abuts the inner face of section 84 and one side edge of section 84 abuts the inner face of section 81. The extensions 92 of the sections 81, 82, 83, 84 extend respectively through the grooves 90 of the sections 82, 83, 84 and 81. The bottom edges 94 of the extensions 92 seat on the bottom walls of the grooves 90. The top edges 93 of the extensions 92 project beyond the top walls of the grooves 91. The arrangement referred to provides for the body sections to interengage with each other. The retaining member 90 is then slipped over the assembled body sections and seats on the top edges 93 of the extensions 92. The upper portions of the base sections are then inserted into the slots 96 of the body section. The locking member 89 is then arranged between the base sections but not in locking engagement therewith. The bottom member or section 114 is then positioned within the assembled body sections in a manner to have the yoke-shaped member 103 of the base sections to extend through the slots and opening formed in the body member 114. The locking member is then arranged for locking engagement with the base sections and when in the latter position it seats on the extensions at the lower portions of the base sections and also has the legs 108 extend upwardly through the opening 109', the base sections extend into the notches 109. The base sections when locked overlap the retaining members.

Figure 4 of the drawings illustrates the holder as supporting a flower receptacle or pot 114 formed with a valve controlled drain pipe 115 which extends to an opening 116 provided in the body members or sections. The receptacle 114 seats upon the base members or sections.

What I claim is:—

1. A holder for the purpose referred to including a set of side edgewise abutting interengaging knockdown body sections angularly disposed with respect to each other, knockdown base sections angularly disposed with respect to each other and abutting and interengaging with said body sections for sustaining them in an upright position, a removable bottom section for positioning in the assembled body sections, locking and retaining means for detachably securing said sections in assembled position, and the said base sections extending through said bottom section.

2. A holder for the purpose referred to including a set of side edgewise abutting interengaging knockdown body sections angularly disposed with respect to each other, knockdown base sections angularly disposed with respect to each other and abutting and interengaging with said body sections for sustaining them in an upright position, a removable bottom section for positioning in the assembled body sections, locking and retaining means for detachably securing said sections in assembled position, the said base sections extending through said bottom section, and the said means abutting the body and base sections.

3. A holder comprising a set of upstanding sidewise abutting knockdown body sections disposed at right angles to each other, a bottom member arranged between said sections to provide in connection therewith a container portion, a set of knockdown base sections corresponding in number to that of the body sections and each disposed at right angles to a body section, said base sections interengaging with and having portions thereof extending upwardly between the body sections, said portions projecting above and interengaging with said bottom member, said base sections supporting said bottom member, and means coacting with the base sections for maintaining the body sections in sidewise abutting relation and for detachably coupling the base sections and body sections together.

In testimony whereof, I affix my signature hereto.

FRED A. WRIGHT.